Feb. 1, 1927.
W. FOSTER
1,616,360
RACK
Filed April 14, 1926
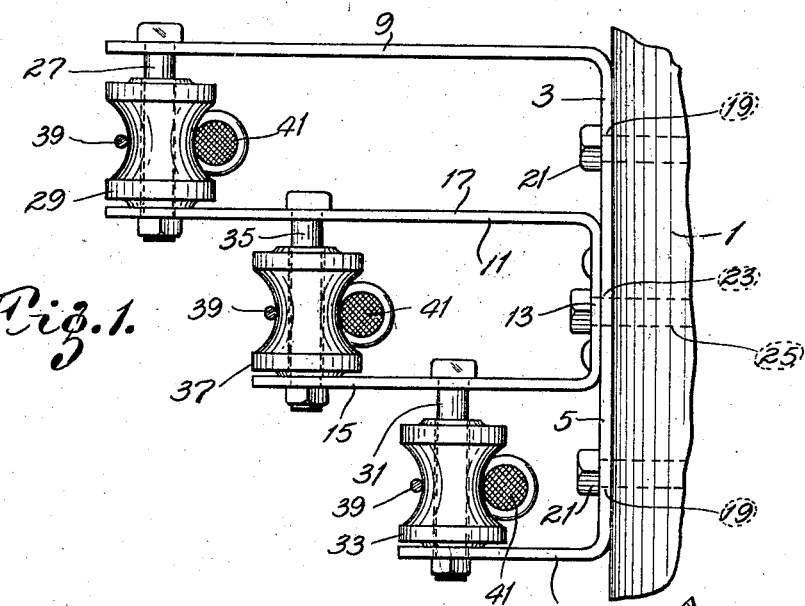
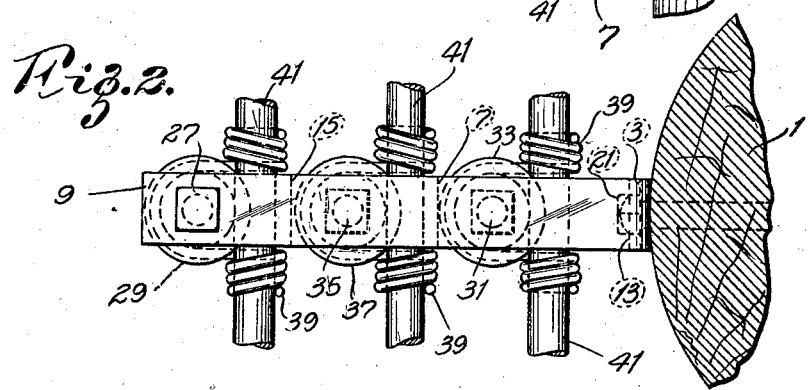
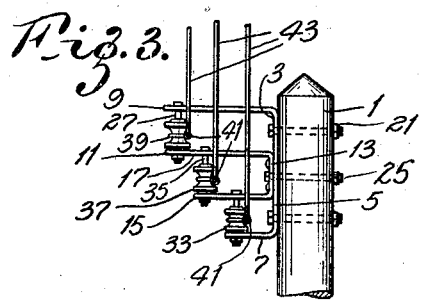
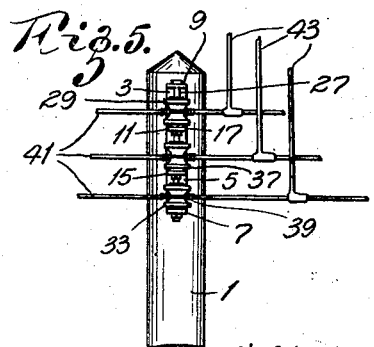
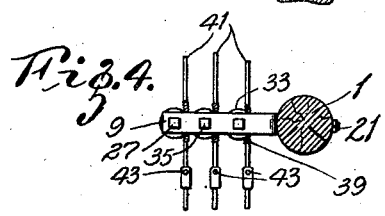
William Foster, Inventor Patented Feb. 1, 1927.

1,616,360

UNITED STATES PATENT OFFICE.

WILLIAM FOSTER, OF PHILADELPHIA, PENNSYLVANIA, ASSIGNOR TO PHILIP H. CHASE, OF BALA, PENNSYLVANIA.

RACK.

Application filed April 14, 1926. Serial No. 101,929.

This invention relates to racks and with regard to certain more specific features to racks for insulators and similar fixtures adapted to support electric wires and the like.

Among the several objects of the invention may be noted the provision of a rack adapted to give increased separation of wires fastened thereto; the provision of a rack which provides maximum separation for taps leading into said wires from any and all directions including vertical and horizontal directions; the provision of a rack which overcomes the necessity for offsetting the junctures of said taps; the provision of a rack of the class described which, in view of said advantages, permits of decreasing pole heights instead of increasing said heights; and the provision of such a device as described which is simple and economical of fabrication and of such ruggedness as to be adapted to long and hard usage. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings in which are illustrated one of various possible embodiments of the invention, Fig. 1 is a side elevation of the rack showing insulators and wires applied thereto;

Fig. 2 is a plan view of Fig. 1;

Fig. 3 is a side elevation of the rack shown applied to a pole and vertical taps leading to wires thereon;

Fig. 4 is a plan view of Fig. 3;

Fig. 5 is a side view of Fig. 4 but shows the vertical taps moved out of a single plane.

Similar reference characters indicate corresponding parts throughout the several views of the drawings.

Referring now more particularly to Fig. 1, there is illustrated at numeral 1 a pole to which the form of rack herein to be described is generally fastened. The rack may be applied to other like members or to brackets which fasten to a pole or a like member.

The rack itself comprises a U-shaped member 3 which has a body portion 5. The body portion 5 has legs 7 and 9 integrally connected therewith, at its ends. These legs are positioned downwardly and upwardly respectively. The legs 7 and 9 are formed substantially at ninety degrees with regard to the body 5, and the leg 9 is substantially longer than the leg 7.

Spaced more or less centrally of the body 5 and riveted thereto is a second U-shaped member 11. This member 11 has a body portion 13, a short leg 15, positioned downwardly, and a long leg 17, positioned upwardly, which legs are formed at substantially ninety degrees with respect to the body 13 and have a substantially parallel relationship with the legs 7 and 9. The leg 17 of the U-shaped member 11 is preferably equal in length to the leg 9 of the U-shaped member 3, while the lower leg 15 is shorter than said legs 17 and 9, and the lowermost leg 7 is shorter than all of the other said legs. The member 3 is provided in its body portion 5 with holes 19 for receiving bolts 21 for purposes of supporting the rack or bracket. An aligned hole 23 is also provided in the body portions 13 and 5 through which a third supporting bolt 25 may be passed.

At the outermost ends of the long legs 9 and 17 are formed aligned holes for receiving a supporting stud 27. The stud 27 has an insulator 29 mounted thereon. At the outermost end of the shortest leg 7 and at the mid-portion of the intermediate leg 15 are formed aligned holes for receiving a second supporting stud 31. This stud 31 serves to support a second insulator 33. It will be noted by examining Fig. 1 that the end of the leg 15 is located intermediately of the ends of the legs 7 and 17. Through the end of this leg 15 and at a corresponding intermediate point on the leg 17 are formed aligned holes for mounting a third supporting stud 35. This third stud 35 supports a third insulator 37. The legs 7, 15, 17 and 9 may also be called arms.

The insulators 29, 33 and 37 are adapted to have electric wires and the like fastened thereto in the customary manner, such as by supporting wires 39. It is evident from Fig. 1 that the insulators 29, 33 and 37 are not in alignment either vertically or horizontally and therefore provide (for a given horizontal or vertical distance on a supporting member such as the pole 1) a maximum of spacing between the supported wires 41.

If the insulators are arranged at an angle of the order of forty-five degrees, then the greatest distance is attained between said wires 41 with the least wasted space vertically and horizontally. Of course other angles may be employed, depending upon whether more horizontal or vertical space is available. The said increased spacing of the wires 41 provides the first advantage of the described rack.

Figs. 3 and 4 indicate the manner in which a vertical tap may be readily connected into a main line which is supported on one of the present insulator racks. In these figures the tap wires 43 are illustrated as leading into the main line wires 41 in a single plane and without the use of tap offsets. This is because the insulators 29, 33 and 37 are not vertically arranged and hence the tap wires are automatically thrown out of interference with one another. The result is that the unsightly and troublesome offsets are dispensed with, a stiffer line is provided, and a greater distance between the tap wires may be provided. Incidentally the main line wires 41 are strung in such positions laterally with respect to one another that interference is not had because of possible excessive sag. Furthermore all of the wires 41 and 43 are less liable to sag and swing into one another in the wind or the like. The increased simplicity and universality with which a connection can be made is evident from the above and the drawings.

Fig. 5 illustrates the manner in which the tap wire 43 may be led vertically but not held in a plane positioned at right angles to the main line wire 41. By this means other main line wires, similar to wires 41, strung above and at right angles to the illustrated wires 41, may be directly engaged by the vertical taps 43. The offsets of the tap 43 along the wires 41 are made of such an amount as to put the said taps into proper position to directly meet the other main line wires, which are already strung in offset positions on insulators similar to the ones herein described. The wires 43 may also be offset as described for other purposes, such as for instance, increasing the distances between wires and the like.

It is evident that the interconnections may be indefinitely multiplied (including the use of random angles wires) without seriously complicating the wire network around a given pole, as was the case when similar connections had previously to be made with the required offsets and the like.

The advantages in application of the rack are believed now to be evident. Its construction is of the simplest kind involving only four parts, namely, the two U-shaped portions 3 and 11 and two rivets for fastening them. All parts may be quickly and economically made by means of forging processes. The insulators, their supporting bolts and the three fastening bolts for the bracket comprise standard products which are used interchangeably and may be therefore easily obtained.

In view of the above, it is believed that the various features of this invention will be clear without further elaboration, and it will be seen that with the apparatus herein described, the several objects of the invention are achieved and other advantageous results attained.

As many changes could be made in carrying out the above construction without departing from the scope of the invention, it is intended that matter contained in the above description or shown in the accompanying drawings shall be interpreted as illustrative and not in a limiting sense.

I claim:

1. A rack for insulators comprising a pair of relatively long extensions, an insulator mounted at the ends and between said extensions, a plurality of descendingly shorter extensions juxtapositioned in order next to said long extensions and means for mounting an insulator between pairs of the juxtapositioned shorter extensions at the end of each of the shortest of a given pair.

2. A rack for insulators comprising a pair of relatively long extensions, an insulator mounted at the ends and between said extensions, a plurality of descendingly shorter extensions juxtapositioned in order next to said long extensions and means for mounting an insulator between pairs of the juxtapositioned shorter extensions at the end of each of the shortest of a given pair, the lengths of the shorter extensions being varied in such degree as to provide a straight line alignment between insulators.

3. A rack for insulators comprising a U-shaped portion, a body therefor, and unequal legs; a narrower U-shaped portion mounted therein, a body therefor, and unequal legs; the bodies of the portions being held together; the longer legs of the said portions being equal in length and juxtapositioned; but the shorter legs being of unequal length and juxtapositioned, the longer of the short legs being between the shortest leg and the said longer legs, and means for mounting insulators between the said shorter legs at the end of the shortest leg and between the unequal legs of the narrower U-shaped portion at the end of the shorter of said unequal legs and between the said longer legs at the ends thereof.

4. A rack for insulators comprising a U-shaped portion, a body therefor, and unequal legs; a narrower U-shaped portion mounted therein, a body therefor, and unequal legs; the bodies of the portions being held together; the longer legs of the said portions being equal in length and juxtapositioned; but the shorter legs being of unequal length and juxtapositioned, the longer of the short legs being in length the arithmetic means between the shortest leg and the said longer legs, and means for mounting insulators between the said shorter legs at the end of the shortest leg and between the unequal legs of the narrower U-shaped portion at the end of the shorter of said unequal legs and between the said longer legs at the ends thereof.

5. A rack for insulators comprising a U-shaped portion, a body therefor, and unequal legs, other legs mounted between said legs and on the body portion and extending in the plane of said legs, their lengths being unequal, the longer being positioned next adjacent and being equal in length to the longer of said first-named unequal legs, and the shorter being of a greater length than the shorter of the first-named legs, and means for mounting an insulator between juxtapositioned legs substantially at the ends of the shorter leg of a pair and at the ends of said equal legs.

6. A rack for insulators comprising a body portion, a series of arms extending therefrom of increasing lengths from an endwardly located arm, another endward arm extending from said body portion of a length equal to the longest of said series of arms and means for mounting insulators at the ends of the arms and between spaced pairs thereof in non-aligned relation with respect to each other.

7. A rack for insulators comprising a body portion, a series of arms extending therefrom of increasing lengths from an endwardly located arm, another endward arm extending from said body portion of a length equal to the longest of said series of arms, all of said arms being in parallel relation and means for mounting insulators at the ends of the arms and between spaced pairs thereof, the said increasing lengths being in an arithmetic proportion whereby a straight linear arrangement is had for said insulators.

In testimony whereof, I have signed my name to this specification this 12th day of April, 1926.

WILLIAM FOSTER.